United States Patent
Hyoudou et al.

(10) Patent No.: US 9,231,849 B2
(45) Date of Patent: Jan. 5, 2016

(54) APPARATUS AND METHOD FOR CONTROLLING VIRTUAL SWITCHES

(71) Applicant: FUJITSU LIMITED, Kawasaki-shi, Kanagawa (JP)

(72) Inventors: Kazuki Hyoudou, Chofu (JP); Takeshi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 229 days.

(21) Appl. No.: 13/922,581

(22) Filed: Jun. 20, 2013

(65) Prior Publication Data
US 2014/0047125 A1 Feb. 13, 2014

(30) Foreign Application Priority Data

Aug. 7, 2012 (JP) ................. 2012-174621

(51) Int. Cl.
| | |
|---|---|
| G06F 15/16 | (2006.01) |
| H04L 12/755 | (2013.01) |
| H04L 12/54 | (2013.01) |
| H04L 12/46 | (2006.01) |
| H04L 12/931 | (2013.01) |

(52) U.S. Cl.
CPC .............. *H04L 45/021* (2013.01); *H04L 12/46* (2013.01); *H04L 12/56* (2013.01); *H04L 49/70* (2013.01)

(58) Field of Classification Search
USPC .......................................................... 709/232
See application file for complete search history.

(56) References Cited

U.S. PATENT DOCUMENTS

| 6,411,617 | B1 | 6/2002 | Kilkki et al. |
| 8,639,783 | B1 * | 1/2014 | Bakke et al. ................. 709/220 |
| 8,660,124 | B2 * | 2/2014 | Cardona et al. ............... 370/392 |
| 8,660,129 | B1 * | 2/2014 | Brendel et al. ................ 370/397 |
| 8,671,176 | B1 * | 3/2014 | Kharitonov et al. .......... 709/223 |
| 8,717,895 | B2 * | 5/2014 | Koponen et al. .............. 709/223 |
| 8,730,980 | B2 * | 5/2014 | Bagepalli et al. ............. 370/409 |
| 8,761,187 | B2 * | 6/2014 | Barde .......................... 370/409 |
| 8,767,529 | B2 * | 7/2014 | Kamath et al. ................ 370/218 |
| 8,774,054 | B2 * | 7/2014 | Yin et al. ....................... 370/254 |
| 8,776,050 | B2 * | 7/2014 | Plouffe et al. .................... 718/1 |
| 8,793,685 | B2 * | 7/2014 | Kidambi et al. .................. 718/1 |
| 8,798,056 | B2 * | 8/2014 | Ganga .......................... 370/392 |

(Continued)

FOREIGN PATENT DOCUMENTS

| JP | 2004-506343 | 2/2004 |
| WO | WO 00/35240 | 6/2000 |

*Primary Examiner* — Melvin H Pollack
(74) *Attorney, Agent, or Firm* — Staas & Halsey LLP

(57) ABSTRACT

An apparatus includes a controller, a converter, and table information storing physical identification information identifying a physical port of first and second physical switches in association with virtual identification information identifying a virtual port of a virtual switch. For each virtual switch, the controller outputs control information determined based on a predetermined protocol and manages the received control information. The converter, based on the table information, converts the physical identification information added to the received control information and identifying a physical port via which the first physical switch has received the control information, into the associated virtual identification information, converts the virtual identification information added to the control information outputted from the controller and identifying a virtual port via which the control information is to be transmitted, into the associated physical identification information, and relays the control information between the controller and the second physical switch.

9 Claims, 18 Drawing Sheets

(56) References Cited

U.S. PATENT DOCUMENTS

| | | | |
|---|---|---|---|
| 8,798,080 B2* | 8/2014 | Leu et al. | 370/400 |
| 8,806,025 B2* | 8/2014 | Hummel et al. | 709/227 |
| 8,879,554 B2* | 11/2014 | Emmadi et al. | 370/392 |
| 8,893,125 B2* | 11/2014 | Shah | 718/1 |
| 8,908,691 B2* | 12/2014 | Biswas et al. | 370/392 |
| 8,935,457 B2* | 1/2015 | Feng et al. | 711/6 |
| 8,954,704 B2* | 2/2015 | Cardona et al. | 711/170 |
| 8,954,962 B2* | 2/2015 | Malik et al. | 718/1 |
| 8,958,340 B2* | 2/2015 | Bao et al. | 370/254 |
| 8,959,611 B1* | 2/2015 | Vincent et al. | 726/13 |
| 8,966,035 B2* | 2/2015 | Casado et al. | 709/223 |
| 8,971,323 B2* | 3/2015 | Mithyantha et al. | 370/390 |
| 8,972,611 B2* | 3/2015 | Galles et al. | 709/250 |
| 8,977,726 B2* | 3/2015 | Kumbalimutt | 709/220 |
| 2014/0036730 A1* | 2/2014 | Nellikar et al. | 370/255 |
| 2014/0359620 A1* | 12/2014 | Van Kerkwyk et al. | 718/1 |
| 2015/0067674 A1* | 3/2015 | Melander et al. | 718/1 |
| 2015/0071292 A1* | 3/2015 | Tripathi et al. | 370/392 |

* cited by examiner

FIG. 5

| PHYSICAL ID | | VIRTUAL ID | |
|---|---|---|---|
| PHYSICAL SWITCH ID | PHYSICAL PORT ID | VIRTUAL SWITCH ID | VIRTUAL PORT ID |
| 1 | 1 | 1 | 1 |
| | 2 | 2 | 1 |
| | ... | | |
| | N | 1 | m |
| 2 | 1 | 1 | 2 |
| | ... | | |
| ... | | | |

FIG. 6

| VIRTUAL ID | | PHYSICAL ID | |
|---|---|---|---|
| VIRTUAL SWITCH ID | VIRTUAL PORT ID | PHYSICAL SWITCH ID | PHYSICAL PORT ID |
| 1 | 1 | 1 | 1 |
| | 2 | 2 | 1 |
| | ... | | |
| | m | 1 | N |
| 2 | 1 | 1 | 2 |
| | ... | | |
| ... | | | |

FIG. 7

| TRANSMITTING PORT PHYSICAL ID | | CONNECTION TARGET | | |
|---|---|---|---|---|
| PHYSICAL SWITCH ID | PHYSICAL PORT ID | DEVICE TYPE | PHYSICAL SWITCH ID | PHYSICAL PORT ID |
| 2 | 1 | SERVER | - | - |
| ... | | | | |
| 2 | 5 | PHYSICAL SWITCH | 3 | 3 |
| 2 | 6 | PHYSICAL SWITCH | 3 | 4 |
| 2 | 7 | PHYSICAL SWITCH | 4 | 3 |
| ... | | | | |

APPARATUS AND METHOD FOR CONTROLLING VIRTUAL SWITCHES

CROSS-REFERENCE TO RELATED APPLICATION

This application is based upon and claims the benefit of priority from the prior Japanese Patent Application No. 2012-174621, filed on Aug. 7, 2012, the entire contents of which are incorporated herein by reference.

FIELD

The embodiments discussed herein relate to apparatus and method for controlling virtual switches.

BACKGROUND

The virtualization of resources in a data center that provides a cloud service has gone beyond the virtualization of servers, storage and other resources to include the virtualization of network resources (such as physical switch resources). The treatment of a plurality of physical switches as one virtual switch or the treatment of one physical switch as a plurality of virtual switches may be used during the virtualization of network resources.

Conventionally, the disposition of software (e.g., software for processing a link layer discovery protocol (LLDP)) for managing virtual switches in a system that uses such virtual switch techniques has not been properly considered so far.

For example, the problem of rising system construction costs arises when disposing software for managing virtual switches in devices since the devices for executing such software are desirably high performance devices. Further, the problem of increased network traffic also arises due to an increase in the transfer of control frames for configuring the virtual switches.

Japanese National Publication of International Patent Application No. 2004-506343 discusses a switch that relays packets to a device provided separately from the switch and causes the device to execute a portion of the processing. However, applying the virtual switches described above is not considered as a constituent element in the system of the aforementioned document.

SUMMARY

According to an aspect of the embodiment, an apparatus includes a controller, a converter, and table information in which physical identification information identifying a physical port of first and second physical switches in association with virtual identification information identifying a virtual port of a virtual switch. The controller performs, on the virtual switch, a control process that outputs control information determined based on a predetermined protocol and manages the control information that has been received from the first physical switch. The converter performs, on the control information received from the first physical switch, a first conversion process converting the physical identification information that is added to the received control information and identifies a physical port via which the first physical switch has received the control information, into the associated virtual identification information, based on the table information. The converter performs, on the control information outputted from the controller, a second conversion process converting the virtual identification information that is added to the control information outputted from the controller and identifies a virtual port via which the control information is to be transmitted, into the associated physical identification information, based on the table information. The apparatus relays the control information between the controller and the first and second physical switches.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of data stored in a first conversion table, according to an embodiment;

FIG. 6 is a diagram illustrating an example of data stored in a second conversion table, according to an embodiment;

FIG. 7 is a diagram illustrating an example of topology data, according to an embodiment;

DESCRIPTION OF EMBODIMENT

It is desirable to provide a technique for flexibly disposing software for managing virtual switches in a system having in which a virtual switch for unifying physical switches or dividing a physical switch as a constituent element.

Figure 1:
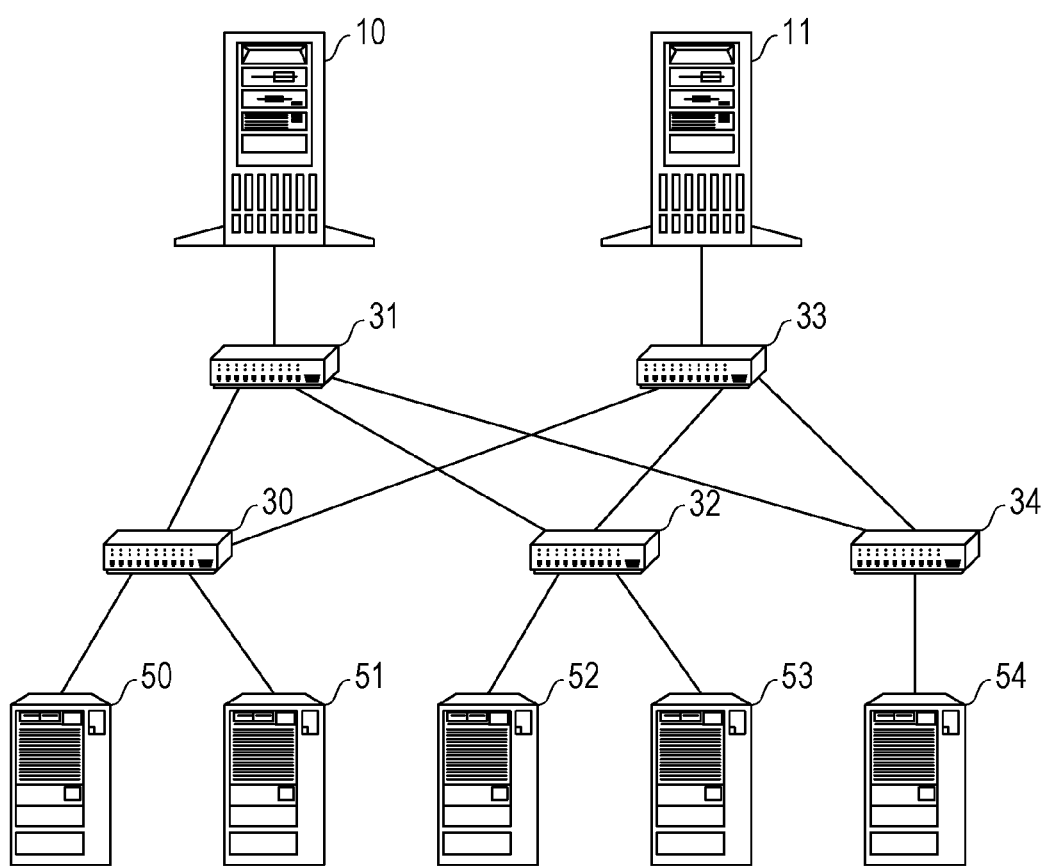
FIG. 1 is a diagram illustrating an example of a system, according to an embodiment.

FIG. 1 is a diagram illustrating an example of a system, according to an embodiment. For example, physical switches 30 to 34 that are layer 2 switches are interconnected through a local area network (LAN) cable and the like. Specifically, the physical switch 30 is connected to the physical switches 31 and 33. The physical switch 31 is connected to the physical switches 30, 32 and 34. The physical switch 32 is connected to the physical switches 31 and 33. The physical switch 33 is connected to the physical switches 30, 32 and 34. The physical switch 34 is connected to the physical switches 31 and 33. The number of physical switches and the connection states are not limited to this example.

A switch control device 10 that implements the principle processing of the embodiment is connected to the physical switch 31. A switch control device 11 that implements the principle processing of the embodiment is connected to the physical switch 33. A server 50 and a server 51 are connected to the physical switch 30. A server 52 and a server 53 are connected to the physical switch 32. A server 54 is connected to the physical switch 34.

Figure 2:
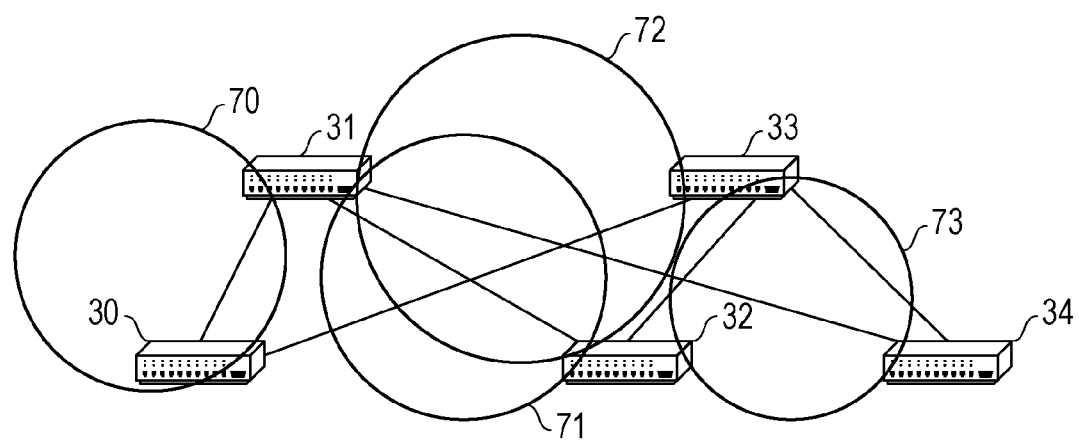
FIG. 2 is a schematic diagram illustrating an example of a virtual switch implementation, according to an embodiment.

Physical switches that have been unified or divided represent a virtual switch in the embodiment. FIG. 2 illustrates an example of an implementation of virtual switches based on the physical switches 30 to 34. The circles in FIG. 2 represent virtual switches. A virtual switch 70 is realized by the physical switch 30 resources and the physical switch 31 resources. A virtual switch 71 is realized by the physical switch 31 resources and the physical switch 32 resources. A virtual switch 72 is realized by the physical switch 31 resources, the physical switch 32 resources, and the physical switch 33 resources. A virtual switch 73 is realized by the physical switch 32 resources, the physical switch 33 resources, and the physical switch 34 resources.

Figure 3:
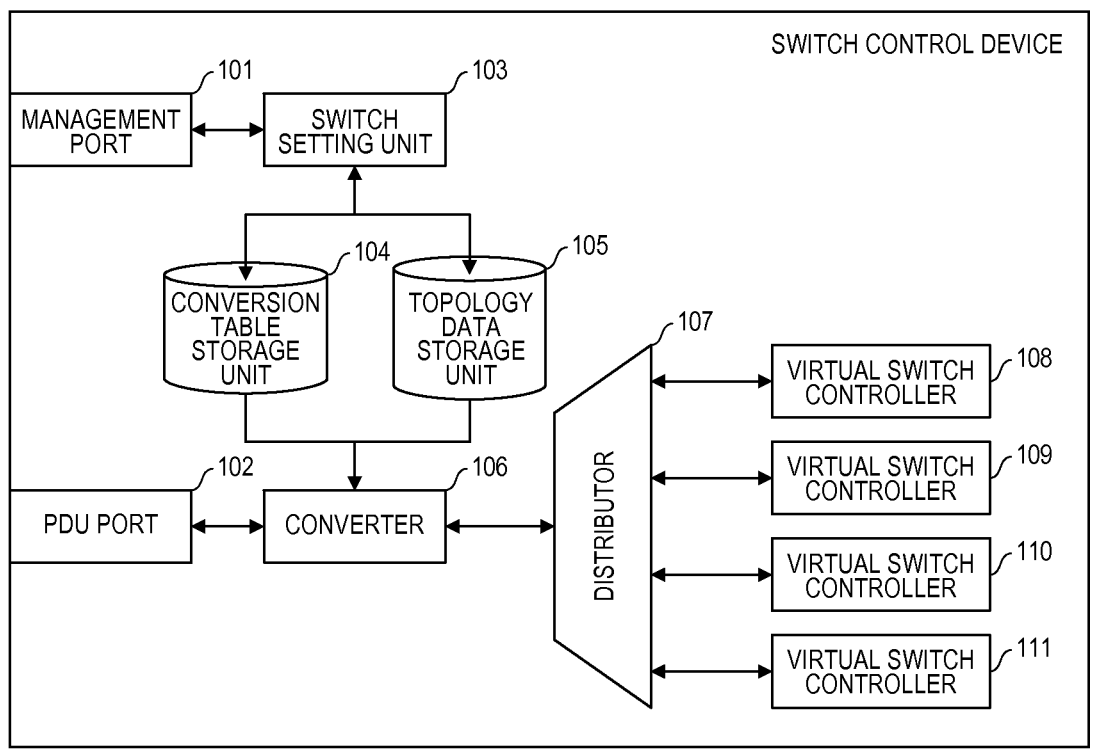
FIG. 3 is a diagram illustrating an example of a functional configuration of a switch control device, according to an embodiment.

FIG. 3 is a diagram illustrating an example of a functional configuration of a switch control device, according to an embodiment. FIG. 3 illustrates a functional block diagram of the switch control device 10 and the switch control device 11. The example in FIG. 3 includes a management port 101, a protocol data unit (PDU) port 102, a switch setting unit 103, a conversion table storage unit 104, a topology data storage unit 105, a converter 106, a distributor 107, and virtual switch controllers 108 to 111 that are software for managing virtual switches.

The switch setting unit 103 uses data (e.g., data transmitted by a notification unit 303 (FIG. 4) in a physical switch) received via the management port 101 to update data stored in the conversion table storage unit 104 and data stored in the topology data storage unit 105. The switch setting unit 103 also uses the data stored in the conversion table storage unit 104 and the data stored in the topology data storage unit 105 to set a communication path for control frames (hereinbelow referred to as "PDU") according to a predetermined protocol (e.g., LLDP or spanning tree protocol (STP)) to the physical switches 30 to 34. The setting of the communication path specifically refers to the setting for using belowmentioned tag IDs to allow the transfer of PDUs (e.g., setting of a table in a physical switch). Normal frames (i.e., frames other than the abovementioned PDU frames) transmitted and received in the system illustrated in FIG. 1 are transferred according to another setting (e.g., using a forwarding database (FDB) and the like) different from the setting for transferring the PDUs.

The converter 106 receives, via the PDU port 102, a PDU to which receiving port data is added and conducts processing on the received PDUs by using data stored in the conversion table storage unit 104. The converter 106 then outputs the processed PDUs to the distributor 107. The converter 106 receives a PDU to which transmitting port data is added from the distributor 107 and conducts processing on the received PDUs by using the data stored in the conversion table storage unit 104 and the data stored in the topology data storage unit 105. The converter 106 the outputs the processed PDUs to the PDU port 102 and the distributor 107.

The distributor 107 outputs the PDUs received from the converter 106 to one of the virtual switch controllers 108 to 111 on the basis of the receiving port data attached to the PDU. The distributor 107 outputs, to the converter 106, PDUs received from the virtual switch controllers 108 to 111 and having transmitting port data added thereto.

The virtual switch controllers 108 to 111 output PDUs to which transmitting port data is added to the distributor 107 in, for example, certain time periods. The virtual switch controllers 108 to 111 receive PDUs to which receiving port data is added from the distributor 107 and use the PDUs to conduct known processing. The known processing may be, for example, processing for managing information included in the PDUs according to a management information base (MIB). In the embodiment, one virtual switch controller is executed for each virtual switch.

Figure 4:
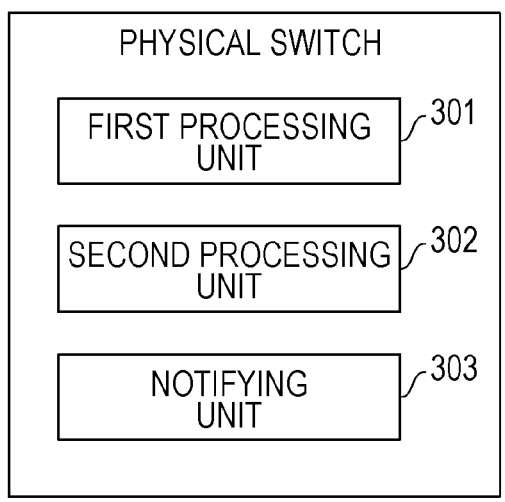
FIG. 4 is a diagram illustrating an example of a functional configuration of a physical switch, according to an embodiment.

FIG. 4 is a diagram illustrating an example of a functional configuration of a physical switch, according to an embodiment. FIG. 4 illustrates a functional block diagram of the physical switches 30 to 34. The physical switches 30 to 34 each include a first processing unit 301, a second processing unit 302, and a notifying unit 303.

The first processing unit 301 outputs PDUs to a physical port identified by a physical ID included in transmitting port data upon receiving a PDU to which the transmitting port data is added from the switch control device 10 or 11. Upon receiving a PDU to which no transmitting port data is added, the second processing unit 302 adds receiving port data to the PDU and transmits the PDU to the switch control device 10 or 11. Upon detecting an event related to a disconnection of a physical link, the notifying unit 303 transmits information about the event to the switch control device 10 or 11.

FIG. 5 is a diagram illustrating an example of data stored in a first conversion table, according to an embodiment. FIG. 5 illustrates a first conversion table stored in the conversion table storage unit 104. Physical IDs and virtual IDs are stored in the example in FIG. 5. A physical switch ID and a physical port ID are included in the physical ID. A virtual switch ID and a virtual port ID are included in the virtual ID. The first conversion table is a table used for converting a physical ID to a virtual ID.

FIG. 6 is a diagram illustrating an example of data stored in a second conversion table, according to an embodiment. FIG. 6 illustrates a second conversion table stored in the conversion table storage unit 104. Physical IDs and virtual IDs are stored in the example in FIG. 6. Similar to the first conversion table, a physical switch ID and a physical port ID are included in the physical ID, and a virtual switch ID and a virtual port ID are included in the virtual ID. The second conversion table is a table used for converting a virtual ID to a physical ID.

FIG. 7 is a diagram illustrating an example of topology data, according to an embodiment. FIG. 7 illustrates topology data stored in the topology data storage unit 105. A transmitting port physical ID and connection target information is stored in the example in FIG. 7. A physical switch ID and a physical port ID are included in the physical ID. Information on a type of a device of the connection target, a physical switch ID, and a physical port ID are included in the connection target information.

Figure 8:
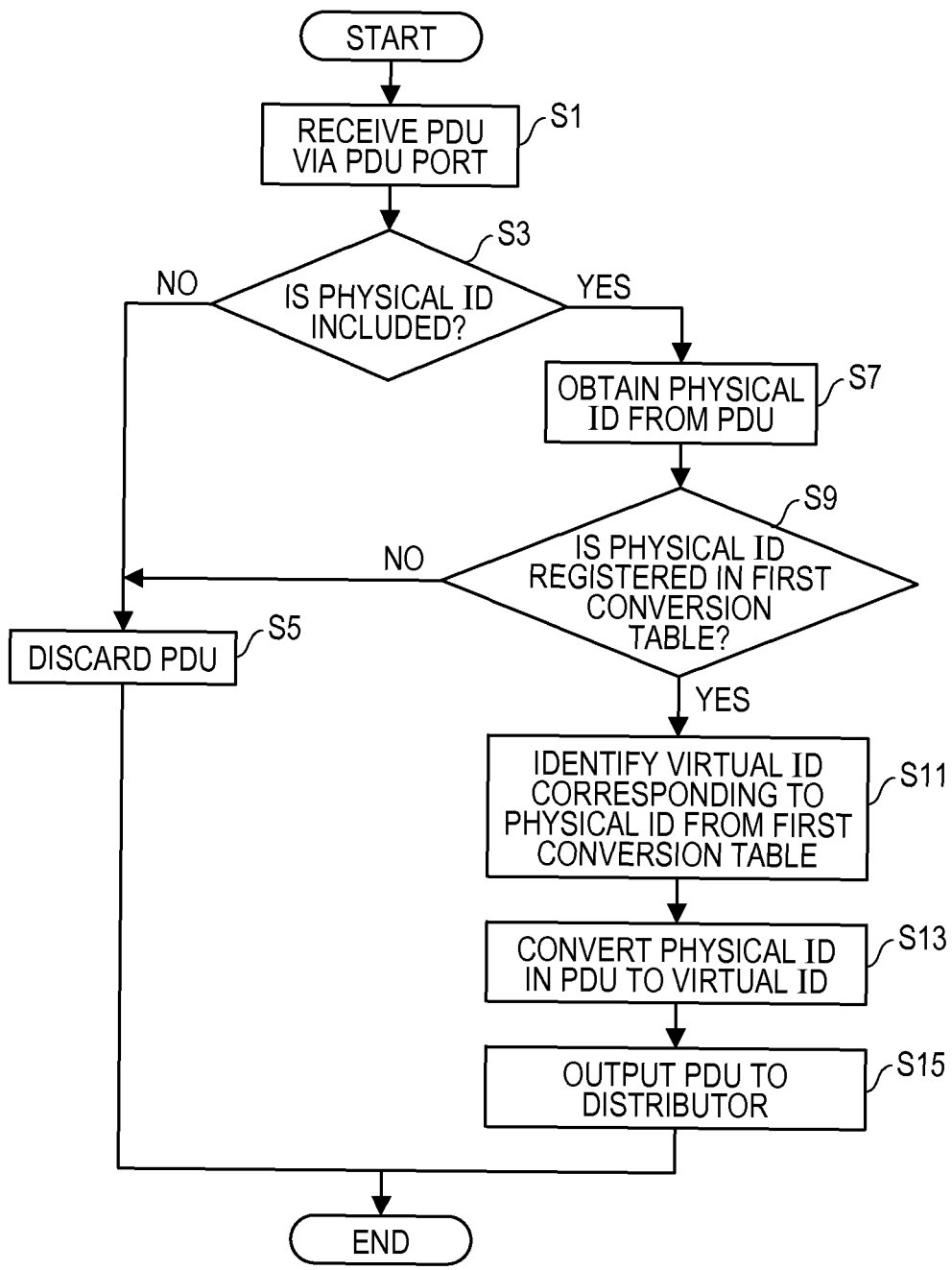
FIG. 8 is a diagram illustrating an example of an operational flowchart for processes conducted by a converter, according to an embodiment.

Next an explanation of the operations of the system illustrated in FIG. 1 will be provided with reference to FIGS. 8 to

16. First, processing conducted by the converter 106 in a switch control device that receives a PDU will be described.

A physical switch (the physical switch 32 in this example) receives a PDU to which receiving port data is not added from a server (the server 52 in this example). The second processing unit 302 adds receiving port data that includes the physical port ID identifying the physical port that received the PDU, a physical switch ID (the ID identifying the physical switch 32 in this example), and a tag ID (the ID identifying the switch control device 11 in this example), to a PDU. Namely, receiving port data is added to the PDU as illustrated in the top row in FIG. 9 to create a PDU as illustrated in the middle row in FIG. 9. The second processing unit 302 then outputs the PDU to a port for transmitting the PDU to the switch control device 11. The PDU transmitted by the physical switch 32 is transferred to the switch control device 11 based on the tag ID and the setting previously conducted by the switch setting unit 103.

In the embodiment, PDU transfer target switch control devices are assumed to be previously set in each physical switch. It is assumed that received PDUs are set to be transferred to the switch control device 11 by the physical switch 32.

The converter 106 in the switch control device 11 receives the PDU transmitted by the physical switch 32 via the PDU port 102 (FIG. 8, step S1).

The converter 106 determines whether a physical ID (i.e., a physical switch ID and a physical port ID) are included in the received PDU (step S3).

When no physical ID is included (No in step S3), the converter 106 discards the received PDU (step S5). The PDU is not applicable to processing by the converter 106 when the physical ID is not included.

When the physical ID is included (Yes in step S3), the converter 106 obtains the physical ID (i.e., the physical switch ID and the physical port ID) from the PDU (step S7).

The converter 106 determines whether the acquired physical ID is stored in the first conversion table in the conversion table storage unit 104 (step S9). Whether a combination of the physical switch ID and the physical port ID is stored in the first conversion table is determined in step S9.

When the acquired physical ID is not stored in the first conversion table (No in step S9), the processing moves to step S5. An error may have occurred, for example, when the physical ID is not stored in the first conversion table.

When the physical ID is stored in the first conversion table (Yes in step S9), the converter 106 identifies the virtual ID corresponding to the physical ID based on the first conversion table (step S11).

Figure 9:
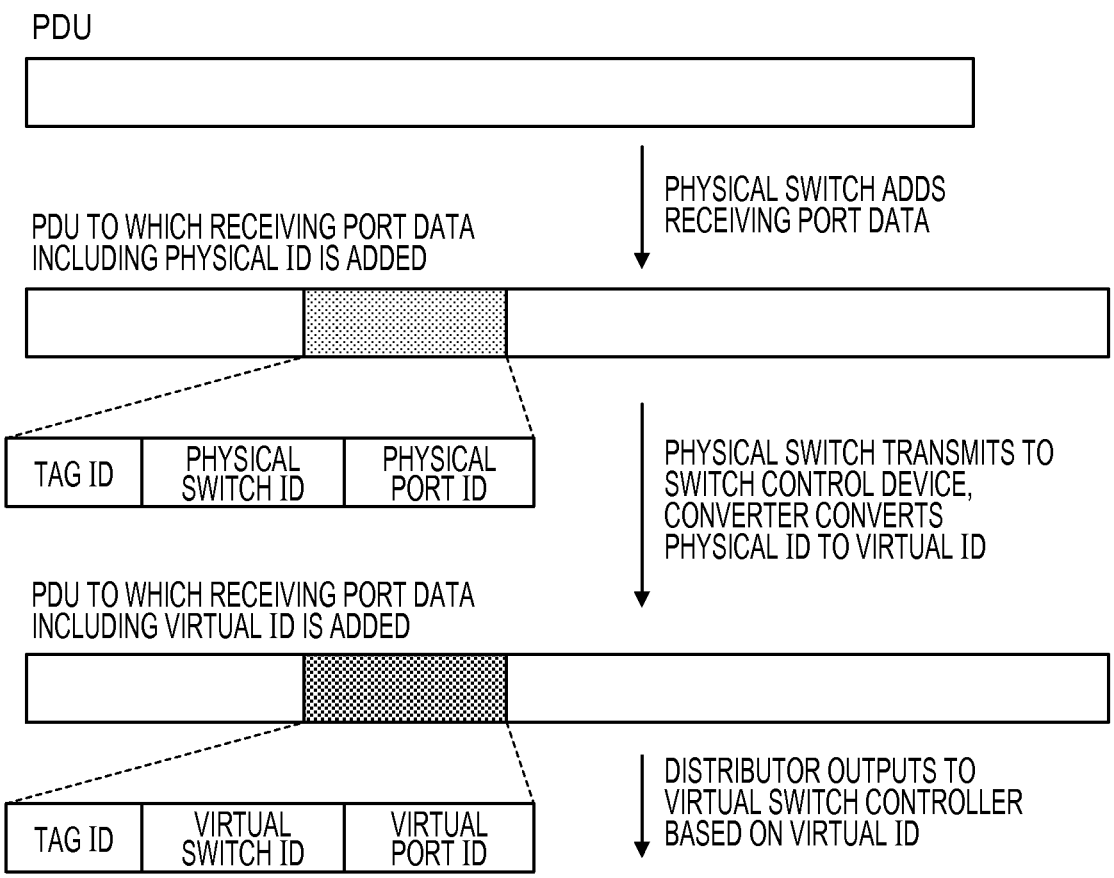
FIG. 9 is a schematic diagram illustrating processing for converting physical identification (ID) information into virtual identification information, according to an embodiment.

The converter 106 converts the physical ID added to the received PDU to the virtual ID identified in step S11 (step S13). Namely, the physical ID in the PDU as illustrated in the middle row in FIG. 9 is converted into the virtual ID to create the PDU as illustrated in the bottom row in FIG. 9.

The converter 106 outputs the PDU acquired by the processing in step S13 to the distributor 107 (step S15). The processing is then completed.

The outputting of a PDU to which a virtual ID is added, to a virtual switch controller is enabled by implementing the above processing.

Next, an explanation of processing conducted by the distributor 107 that receives the PDU from the converter 106 will be described with reference to FIG. 10.

Figure 10:
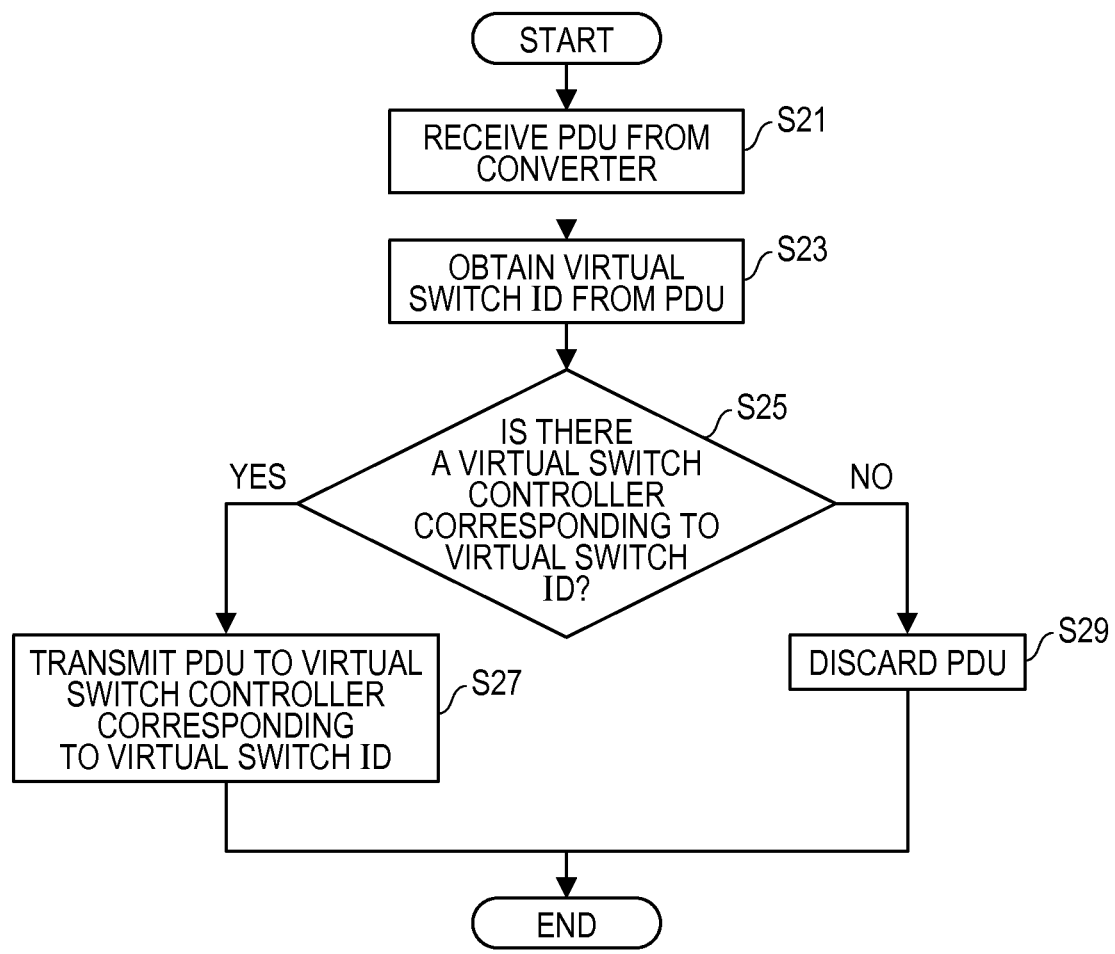
FIG. 10 is a diagram illustrating an example of an operational flowchart for processes conducted by a distributor, according to an embodiment.

First, the distributor 107 receives the PDU from the converter 106 (FIG. 10, step S21).

The distributor 107 obtains the virtual switch ID from the PDU received in step S21 (step S23).

The distributor 107 determines whether a virtual switch controller corresponding to the virtual switch ID obtained in step S23 exists (step S25). That is, a determination is made as to whether a virtual switch controller corresponding to the virtual switch identified by the virtual switch ID exists.

When a virtual switch controller corresponding to the virtual switch ID exists (Yes in step S25), the distributor 107 transmits the PDU to the virtual switch controller corresponding to the virtual switch ID (step S27).

Meanwhile, when a virtual switch controller corresponding to the virtual switch ID does not exist (No in step S25), the distributor 107 discards the PDU (step S29). This is because the virtual switch controller corresponding to the virtual switch ID is operated by a switch control device other than the switch control device 11. The processing is then completed.

By implementing the abovementioned processing, a virtual switch controller for each virtual switch is able to be operated in the switch control device.

Next, an explanation of processing conducted by the distributor 107 that receives the PDU from a virtual switch controller will be described with reference to FIG. 11.

Figure 11:
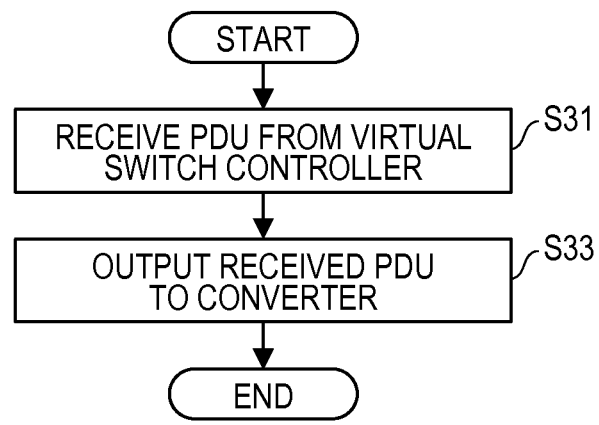
FIG. 11 is a diagram illustrating an example of an operational flowchart for processes conducted by a distributor, according to an embodiment.

First, the distributor 107 receives a PDU from one of the virtual switch controllers 108 to 111 (FIG. 11, step S31). Transmitting port data is added to the PDU received from the virtual switch controller. Namely, the distributor 107 receives the PDU as illustrated in the top row in FIG. 12. The tag ID is a physical switch ID identifying a physical switch having a transmitting port for example.

The distributor 107 outputs the PDU received from the virtual switch controller to the converter 106 (step S33). The processing is then completed.

The processing by the converter 106 of the PDU outputted from the virtual switch controller is enabled by implementing the above processing.

Next, processing conducted by the converter 106 that receives a PDU from the distributor 107 will be described with reference to FIGS. 13 to 16.

Figure 13:
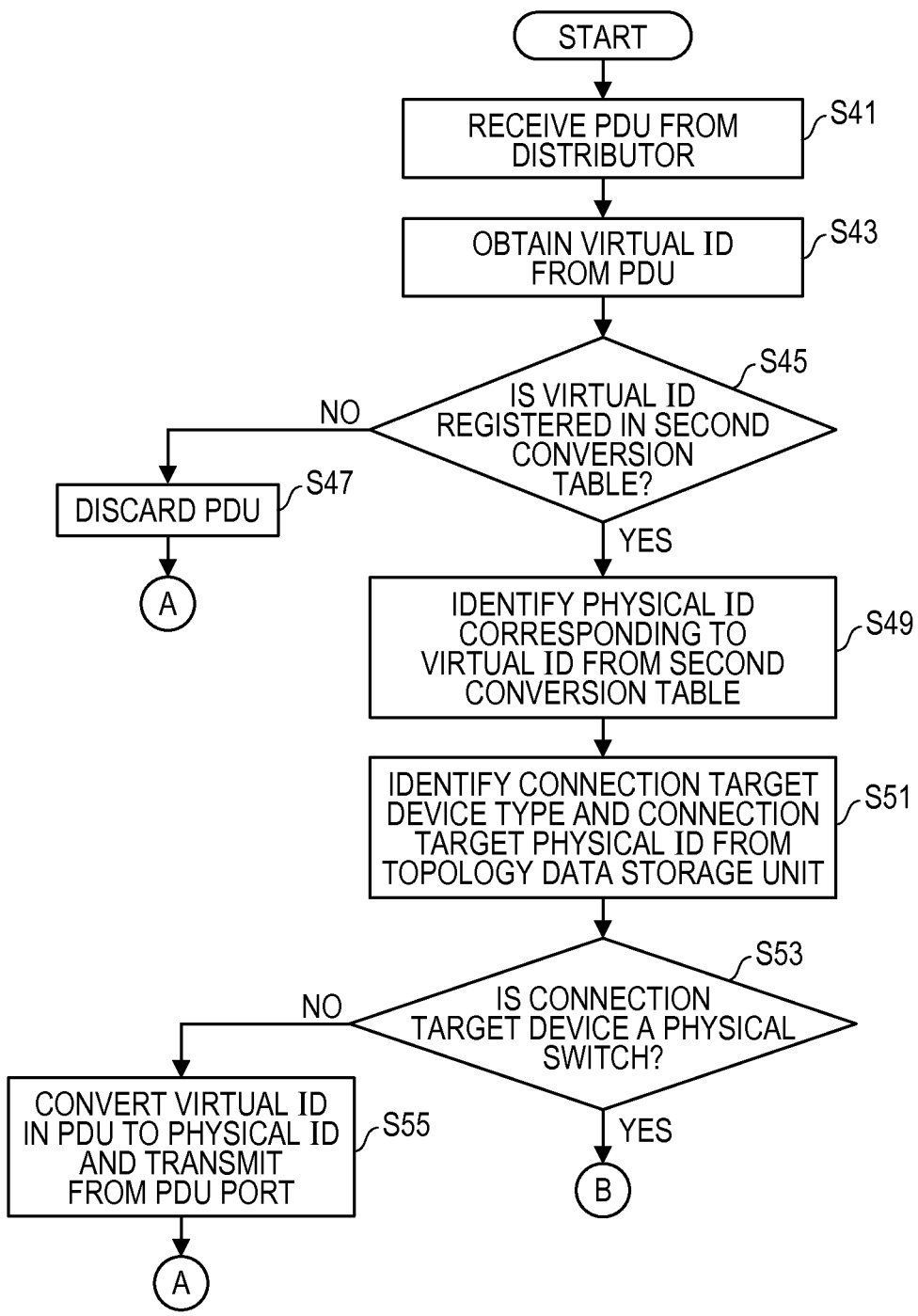
FIG. 13 is a diagram illustrating an example of an operational flowchart for processes conducted by a converter, according to an embodiment.

First, the converter 106 receives a PDU to which transmitting port data is added (FIG. 13, step S41).

The converter 106 obtains the virtual ID (i.e., the virtual switch ID and the virtual port ID) from the received PDU (step S43).

The converter 106 determines whether the obtained virtual ID is stored in the second conversion table (step S45). A determination is made in step S45 as to whether a combination of the virtual switch ID and the virtual port ID is stored in the second conversion table.

When the acquired virtual ID is not stored in the second conversion table (No in step S45), the processing moves to step S47. An error may have occurred, for example, when the virtual ID is not stored in the second conversion table.

When the obtained virtual ID is stored in the second conversion table (Yes in step S45), the converter 106 identifies the physical ID corresponding to the virtual ID from the second conversion table (step S49).

The converter 106 identifies, from the topology data storage unit 105, the physical ID and the type of connection target device corresponding to the physical ID identified in step S49 (step S51).

The converter 106 determines whether the connection target device is a physical switch on the basis of the type of the connection target device identified in step S51 (step S53).

Figure 12:
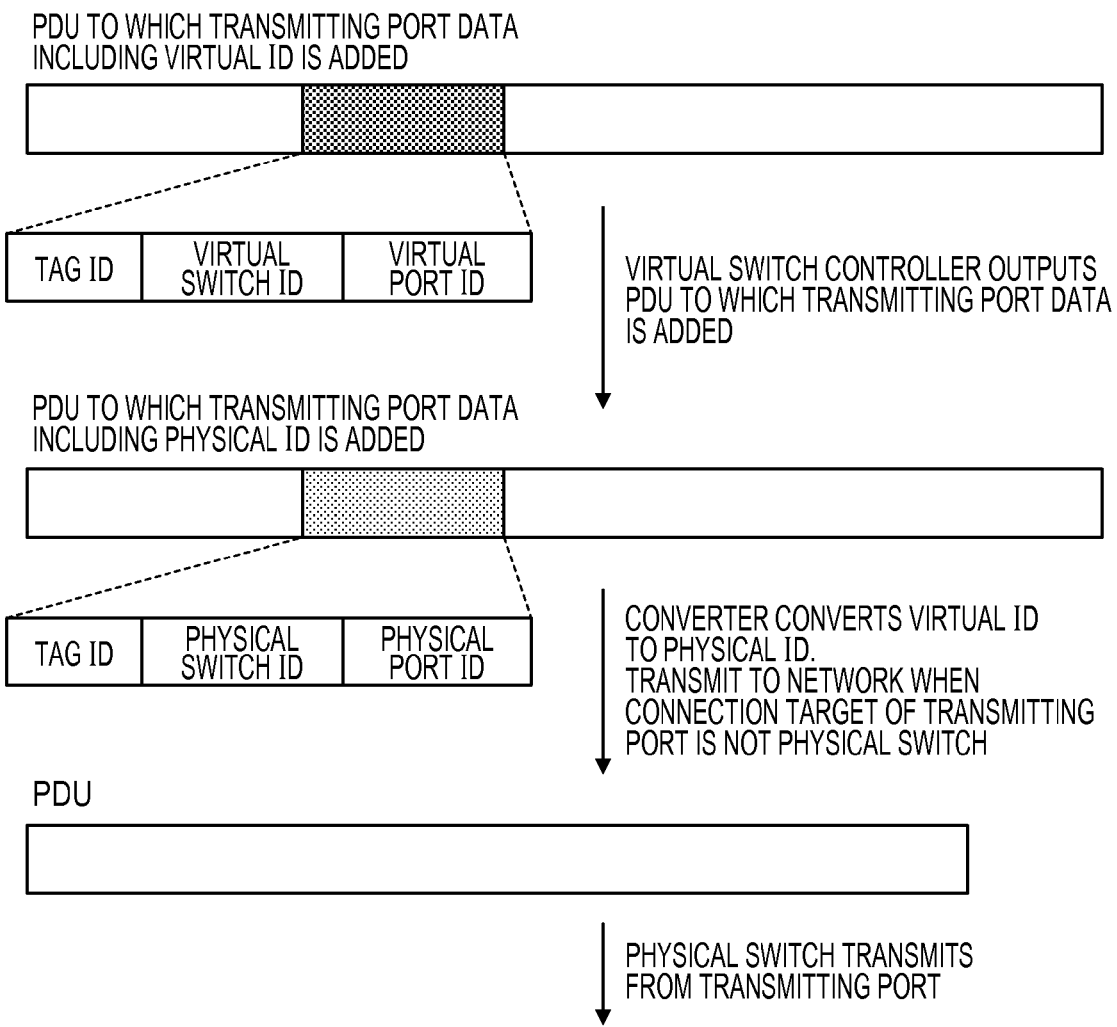
FIG. 12 is a schematic diagram illustrating processing for converting virtual identification information into physical identification information, according to an embodiment.

When the connection target device is not a physical switch (No in step S55), the converter 106 converts the virtual ID in the PDU to the physical ID identified in step S49 and transmits the PDU from the PDU port 102 (step S55). The processing moves via terminal A to FIG. 14 and the processing is completed. In step S55, the virtual ID in the PDU illustrated in the top row in FIG. 12 is converted to a physical ID to create the PDU illustrated in the middle row in FIG. 12. The PDU transmitted in step S55 is transferred to the physical switch identified by the tag ID on the basis of the tag ID added to the PDU and the setting previously conducted by the switch setting unit 103.

Figure 14:
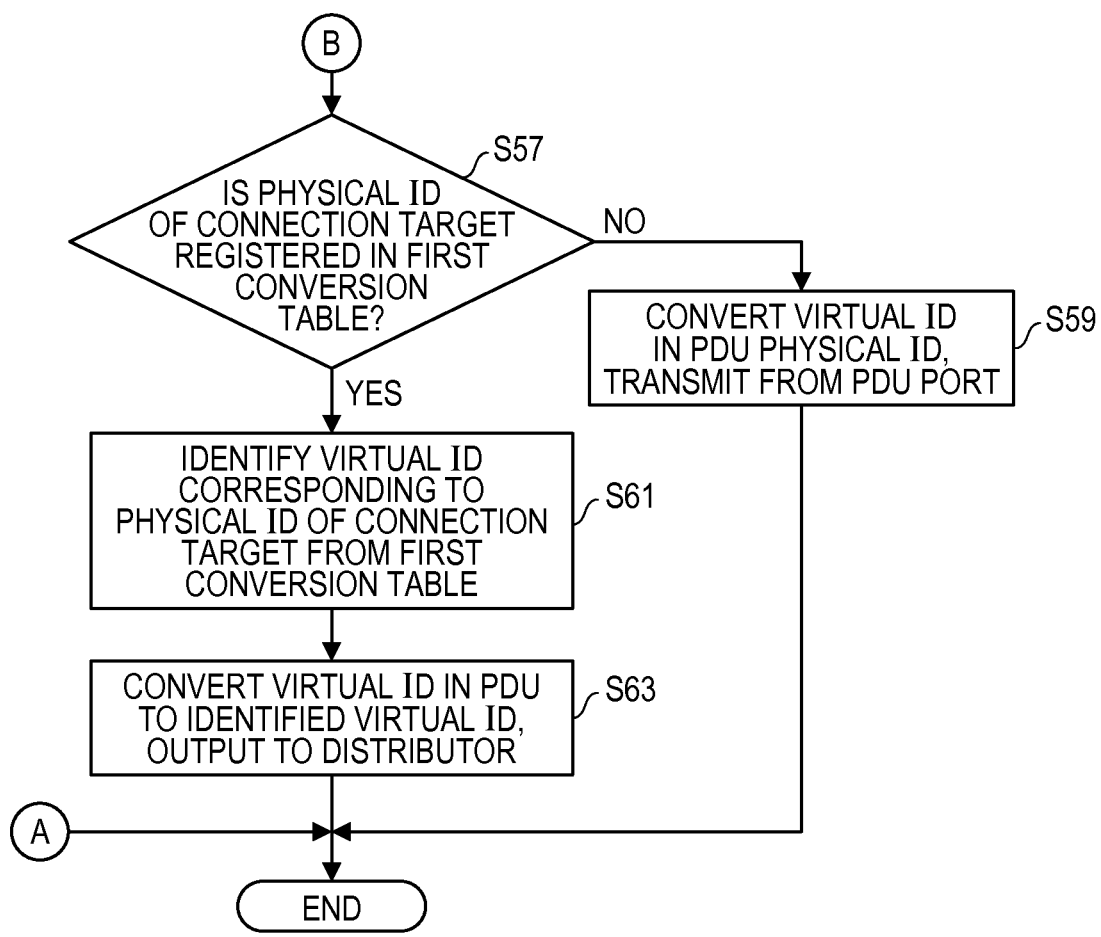
FIG. 14 is a diagram illustrating an example of an operational flowchart for processes conducted by a converter, according to an embodiment.

Meanwhile, when the connection target device is a physical switch (Yes in step S53), the processing moves via terminal B to step S57 in FIG. 14.

Switching to the description in FIG. 14, the converter 106 determines whether the physical ID of the connection target identified in step S51 is stored in the first conversion table (step S57). Whether a combination of the physical switch ID and the physical port ID is stored in the first conversion table is determined in step S57.

When the physical ID of the connection target identified in step S51 is not stored in the first conversion table (No in step S57), the converter 106 converts the virtual ID in the PDU to the physical ID identified in step S49 and transmits the PDU from the PDU port 102 (step S59). The processing is then completed. An error may have occurred, for example, when the physical ID is not stored in the first conversion table.

In step S59, the virtual ID in the PDU illustrated in the top row in FIG. 12 is converted to a physical ID to create the PDU illustrated in the middle row in FIG. 12. The PDU transmitted in step S59 is transferred to the physical switch identified by the tag ID on the basis of the tag ID added to the PDU and the setting previously conducted by the switch setting unit 103.

Meanwhile, when the physical ID of the connection target is stored in the first conversion table (Yes in step S57), the converter 106 identifies the virtual ID corresponding to the physical ID of the connection target identified in step S51, from the first conversion table (step S61).

The converter 106 converts the virtual ID in the PDU to the virtual ID identified in step S61 and outputs the PDU to the distributor 107 (step S63). The processing is then completed.

The transmitting of a PDU to which a physical ID is added, to a physical switch is enabled by implementing the above processing.

The processing in steps S41 to S63 is described in detail with reference to FIGS. 15 and 16.

Figure 15:
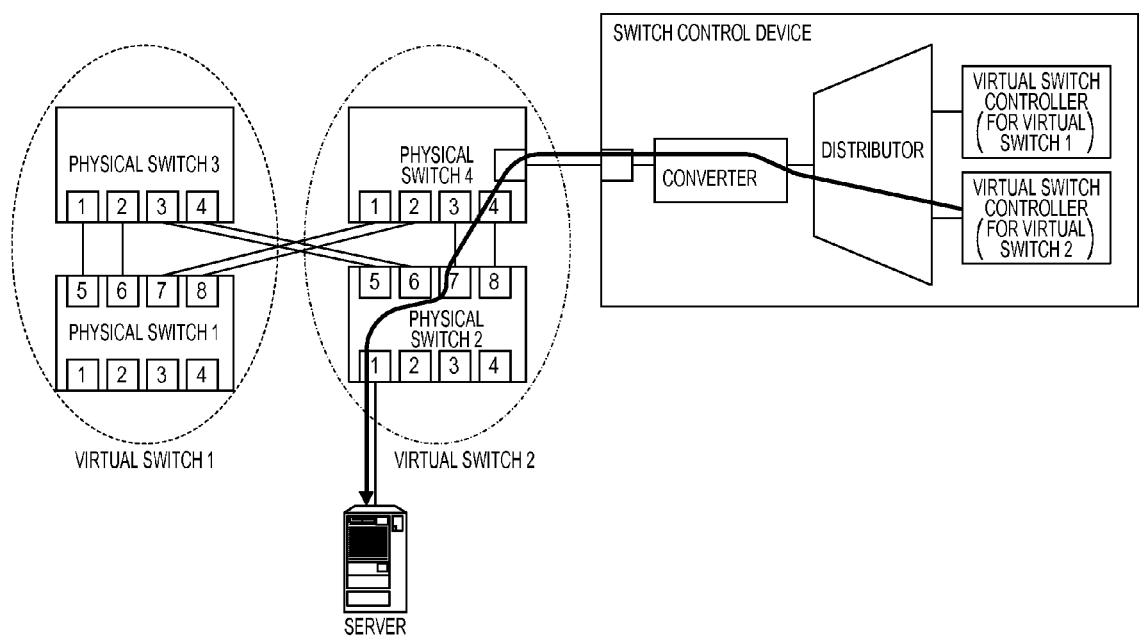
FIG. 15 is a schematic diagram illustrating optimization of a communication path, according to an embodiment.
Figure 16:
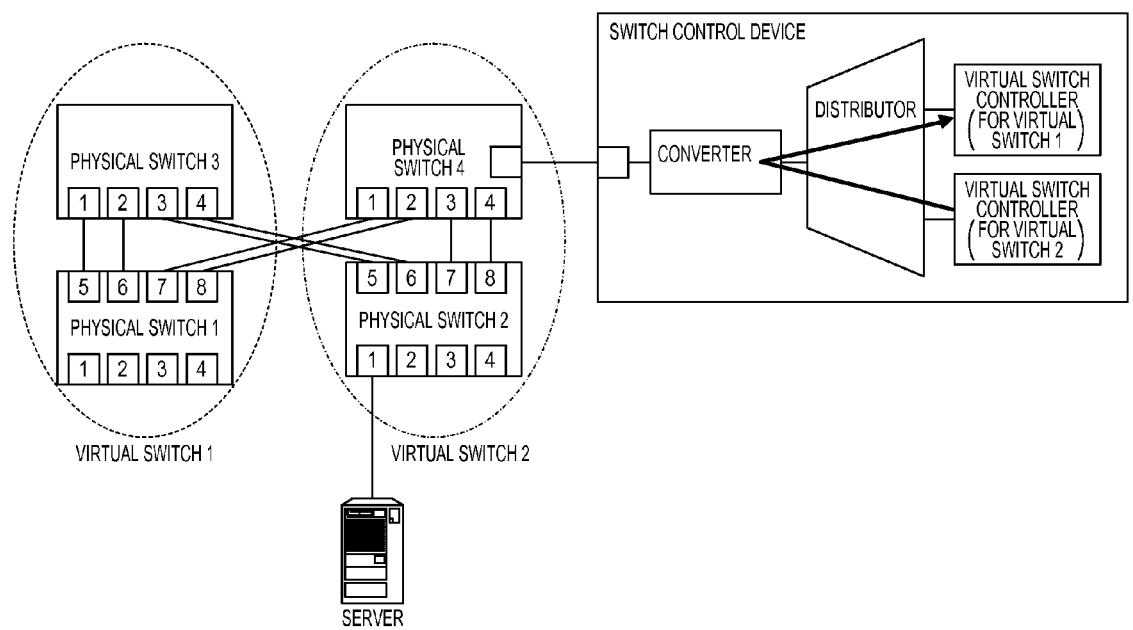
FIG. 16 is a schematic diagram illustrating optimization of a communication path, according to an embodiment.

A virtual switch 1 and a virtual switch 2 are realized by the resources of physical switches 1 to 4 in a system illustrated in FIGS. 15 and 16. A physical port 1 in the physical switch 2 is connected to a physical port of a server, and one physical port in the physical switch 4 is connected to a physical port of a switch control device.

A virtual switch controller for the virtual switch 1 and a virtual switch controller for the virtual switch 2 are implemented in the switch control device. It is assumed that data as illustrated in FIG. 7 is stored in the topology data storage unit 105 in the switch control device.

For example, it is assumed that the converter 106 implements the processing in step S49 on the PDU outputted from the virtual switch controller for the virtual switch 2 to acquire a physical switch ID "2" and a physical port ID "1". In this case, the type of connection target device identified from the topology data storage unit 105 is a "server." As illustrated in FIG. 15, the PDU is thus transferred to the physical switch 2, and after the physical switch 2 removes the transmitting port data in the PDU, the PDU is transferred to the server.

Meanwhile, it is assumed that the converter 106 implements the processing in step S49 on the PDU outputted from the virtual switch controller for the virtual switch 2 to acquire the physical switch ID "2" and the physical port ID "5". In this case, the type of connection target device identified from the topology data storage unit 105 is a "physical switch" (specifically, the physical switch 3). Therefore, the converter 106 outputs the PDU to which the virtual ID for the virtual switch 1 is added, to the distributor 107, since the above case is regarded as exchange of a PDU between the virtual switch 1 and the virtual switch 2. The distributor 107 then outputs the received PDU to the virtual switch controller for the virtual switch 1.

In this way, in a case where a PDU is to be exchanged between virtual switches, the PDU is not outputted from the PDU port to the network, and instead the PDU is transferred from one virtual switch controller to another virtual switch controller in the switch control device. Consequently, a reduction in network traffic may be achieved.

According to the embodiment, the processing for transmitting and receiving PDUs by a virtual switch may be conducted by a switch control device instead of a physical switch. Namely, the software for controlling the virtual switches may be disposed flexibly in the system. Even if the system is modified (e.g., the number of virtual switches is changed), an increase or decrease in the number of CPUs or CPU cores in the switch control device, or in the number of switch control devices may be handled in a flexible manner.

While the embodiments have been described as above, the present invention is not limited to these embodiments. For example, the functional block diagrams of the switch control devices 10 and 11 and of the physical switches 30 to 34 described above may not correspond to an actual program module configuration.

The configurations of the tables described above are merely examples, and are not necessarily configured as described above. Moreover, the order of the processing flows may be altered so long as the processing results do not change. Moreover, the processing flows may be conducted concurrently.

The method of adding the receiving port data to the PDU is not limited to the example described above. For example, the PDU may be encapsulated by a MAC frame that includes the MAC address and the physical ID of the transmission source physical switch (i.e., MAC-in-MAC). In this case, the MAC address of the physical switch may be converted to a physical switch ID using a hash function, for example, in the switch control device.

The method of adding the transmitting port data to the PDU is not limited to the example described above. For example, the PDU may be encapsulated by a MAC frame that includes the MAC address and the physical ID of the destination (i.e., MAC-in-MAC). In this case, the physical switch ID of the physical switch may be converted to a physical switch MAC address by using, for example, a previously set table.

While examples of protocols include LLDP and STP, the protocol is not limited to these examples.

Figure 17:
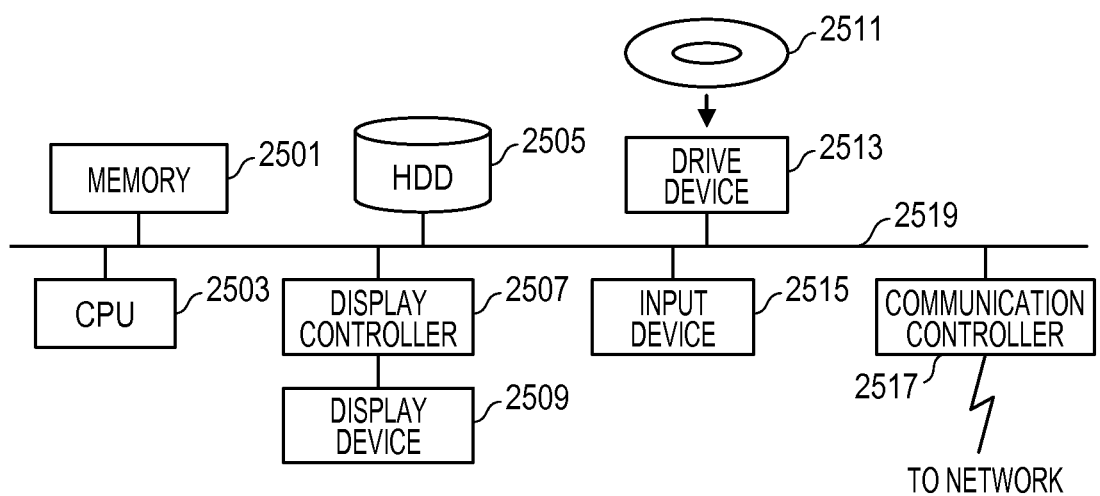
FIG. 17 is a diagram illustrating a configuration example of a control device, according to an embodiment.

The switch control devices 10 and 11 and the servers 50 to 54 described above are computer devices and, as illustrated in FIG. 17, each include a memory 2501, a central processing unit (CPU) 2503, a hard disk drive (HDD) 2505, a display controller 2507 connected to a display device 2509, a drive device 2513 for a removable disk 2511, an input device 2515, and a communication controller 2517 for connecting to a network. All of the devices are connected to a bus 2519. An application program for implementing the processing of the embodiment and for implementing an operating system (OS) is stored in the HDD 2505 and read from the HDD 2505 to the memory 2501 when executed by the CPU 2503. The CPU 2503 controls the display controller 2507, the communication controller 2517, and the drive device 2513 in accordance with the processing contents of the application program to cause the devices to conduct predetermined operations. Data during processing is mostly stored in the memory 2501, but may also be stored in the HDD 2505. In the embodiment, the application program for implementing the abovementioned processing may be stored and distributed on the computer-readable removable disk 2511 and installed from the drive device 2513 to the HDD 2505. The application program may also be installed on the HDD 2505 through a network such as the Internet and the communication controller 2517. This type of computer device implements the various functions described above due to the organic cooperation of hardware, such as the abovementioned CPU 2503 and the memory 2501, and programs such as the OS and the application program.

Figure 18:
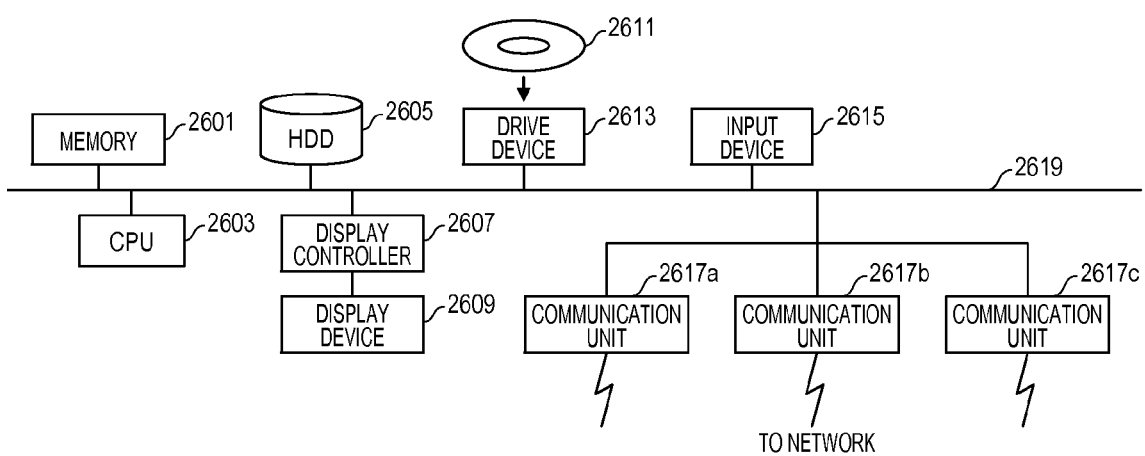
FIG. 18 is a diagram illustrating a configuration example of a physical switch, according to an embodiment.

As illustrated in FIG. 18, the physical switches 30 to 34 described above may also have a configuration in which a memory 2601, a CPU 2603, a HDD 2605, a display controller 2607 connected to a display device 2609, a drive device 2613 for a removable disk 2611, an input device 2615, and a communication unit 2617 (communication units 2617a to 2617c in FIG. 18) connectable to a network are connected by a bus 2619. The display controller 2607, the display device 2609, the drive device 2613, and the input device 2615 may not be included in some cases. An application program for implementing the processing of the embodiment and an operating system (OS) is stored in the HDD 2605 and read from the HDD 2605 to the memory 2601 when executed by the CPU 2603. If desired, the CPU 2603 controls the display controller 2607, the communication unit 2617, and the drive device 2613 to cause the devices to conduct desired operations. Data inputted through any of the communication units 2617 is outputted through a different communication unit 2617. The CPU 2603 controls the communication units 2617 to switch an output target as appropriate. Data during processing is mostly stored in the memory 2601 but may also be stored in the HDD 2605 as desired. In the embodiment, the application program for implementing the abovementioned processing is stored and distributed on the computer-readable removable disk 2611 and installed from the drive device 2613 to the HDD 2605. The application program may also be installed on the HDD 2605 through a network such as the Internet and the communication controllers 2617. This type of computer device implements the various functions described above due to the organic cooperation of hardware, such as the abovementioned CPU 2603 and the memory 2601, and programs such as the OS and the application program.

A summary of the embodiments described above is as follows.

The control device according to a first aspect of the embodiment includes: (A) a first data storage unit that stores identification information of a virtual port of a virtual switch and identification information of a physical port of a physical switch in association with each other; (B) a controller that conducts processing to output control information in a predetermined protocol and processing to manage received control information for each virtual switch; and (C) a converter that conducts a first conversion processing to convert the identification information of a physical port that has received the control information and added to the control information received from the physical switch into identification information of a virtual port by using data stored in a first data storage unit, and a second conversion processing to convert identification information of a virtual port that transmits the control information and added to the control information outputted from the controller into identification information of a physical port by using data stored in the first data storage unit, and relays the control information between the controller and the physical switch.

In this way, the management of the control information may be conducted in a control device separate from a physical switch. Namely, the software for managing the virtual switches may be disposed flexibly in the system.

There may be more than one virtual switch and the number of controllers may be the same as the number of virtual switches, or a plurality of virtual switches may be assigned to one controller. Further, the control device may also include (D) an output unit. The abovementioned converter may (c1) output the control information converted in the first processing to the output unit, and the output unit (d1) may output the converted control information to the controller assigned to a virtual switch having a virtual port identified by the identification information of the virtual port added to the converted control information. In this way, the resources of an information processor apparatus may be effectively assigned in accordance with an increase or decrease in the number of switches.

The control device may further include (E) a second data storage unit that stores identification information of a physical port of a physical switch in association with a type of device of a connection target of the physical port and identification information of a physical port of the connection target. The abovementioned converter then (c2) may identify, from the first data storage unit, the identification information of the physical port corresponding to the identification information of the virtual port added to the control information outputted from the controller; (c3) may identify, from the second data storage unit, the identification information of the type of device of the connection target and the physical port of the connection target corresponding to the identification information of the identified physical port, and determines whether the device of the connection target is a physical switch; (c4) may identify, from the first data storage unit, the identification information of the virtual port corresponding to the identification information of the physical port of the identified connection target when the device of the connection target is a physical switch, and converts the identification information of the virtual port added to the control information outputted from the controller to the identification information of the identified virtual port, and outputs the converted identification information to the output unit; and (c5) may convert the identification information of the virtual port added to the control information outputted from the controller to the identification information of the identified physical port when the device of the connection target is not a physical switch, and transmit the converted identification information to the physical switch having the physical port. When the connection target is a physical switch, the above case may be considered as the transfer of control information from a virtual switch to a virtual switch. Since the control information is transferred inside the information processor apparatus from a controller to a controller as described above, wasteful traffic may be decreased.

The above predetermined protocol may be a link layer discovery protocol or a spanning tree protocol. This is because that processing for transmitting and receiving control information with the above protocols is conducted by software in the physical switch.

A system according to a second aspect of the embodiment includes (F) a control device and (G) a physical switch. The control device includes: (f1) a first data storage unit that stores identification information of a virtual port of a virtual switch and identification information of a physical port of a physical switch in association with each other; (f2) a controller that conducts processing to output control information in a predetermined protocol and processing to manage received control information in each virtual switch; and (f3) a converter that conducts processing to convert identification information of a physical port that received the control information and added to the control information received from the physical switch into identification information of a virtual port by using data stored in a first data storage unit, and conducts processing to convert identification information of a virtual port that transmits the control information and added to the control information outputted from the controller into identification information of a physical port by using data stored in the first data storage unit, and relays the control information between the controller and the physical switch. The abovementioned physical switch includes (g1) a first output unit that outputs the control information to the physical port identified by the identification information of the physical port when the control information to which the identification information of the physical port is added is received from the control device, and (g2) a second output unit that adds the identification information of the physical port that has received the control information to the control information when the control information to which the identification information of a physical port is not added is received, and outputs the control information to a port for transmitting to a control device.

In this way, the management of the control information may be conducted in a control device separate from the physical switch in a system in which the constituent element is a virtual switch. Namely, the software for managing virtual switches may be disposed flexibly in the system in which the constituent element is a virtual switch.

A control method according to a third aspect of the embodiment includes: (H) processing to convert identification information of the physical port that has received the control information and added to the control information received from the physical switch into identification information of a virtual port by using identification information of a virtual port of a virtual switch and identification information of a physical port of a physical switch stored in association with each other in a first data storage unit, and processing to relay the converted control information to each virtual switch in which processing for outputting control information and processing for managing received control information is conducted; and (I) processing to convert identification information of a virtual port for transmitting the control information and added to the control information output from the controller into identification information of a physical port by using data stored in the first data storage unit, and processing to relay the converted control information to a physical switch.

An information processing method according to a fourth aspect of the embodiment is executed by a system having a control device and a physical switch. The information processing method includes: (J) when control information to which identification information of a physical port is not added is received from a physical switch, processing to add the identification information of the physical port that receives the control information to the control information and to output the control information to a port for transmitting control device; (K) processing, by the control device, to convert identification information of a physical port that has received the control information and added to the control information received from the physical switch into identification information of a virtual port by using identification information of a virtual port of a virtual switch and identification information of a physical port of a physical switch stored in association with each other in the first data storage unit, and processing to relay the converted control information to a controller that conducts processing, for each virtual switch, to output control information and processing to manage received control information; (L) processing, by the control device, to convert identification information of a virtual port for transmitting the control information and added to the control information outputted from the controller into identification information of a physical port by using data stored in the first data storage unit, and processing to relay the converted control information to a physical switch; and (M) processing, by the physical switch, to output the control information to a physical port identified by the identification information of the physical port when the control information to which the identification information of the physical port is added is received from the control device.

Programs may be made to cause a computer to conduct processing according to the above methods. The programs are not limited to the above storage media and may be stored in a computer-readable storage medium or a storage device such as, for example, a flexible disk, a CD-ROM, an optical magnetic disc, a semiconductor memory, a hard disk and the like. Intermediate processing results are temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. An apparatus for controlling virtual switches, the apparatus comprising:
    a memory configured to store first table information in which physical port identification information identifying a physical port of a plurality of physical switches is stored in association with virtual port identification information identifying a virtual port of a plurality of virtual switches so that each of the plurality of virtual switches is defined as a set of virtual ports each associated with one of physical ports of the plurality of physical switches;
    a plurality of controllers each assigned to a different one of the plurality of virtual switches and configured to perform, on the assigned virtual switch, a control process that outputs control information determined based on a predetermined protocol and manages the control information that has been received from a physical switch; and
    a converter configured to:
        perform, on the control information received from a physical switch, a first conversion process converting physical port identification information that is added to the received control information and identifies a physical port via which the first switch has received the control information, into the virtual port identification information identifying a virtual port of a virtual switch on which the control process is to be performed, based on the first table information stored in the memory,
        perform, on the control information outputted from a controller, a second conversion process converting virtual port identification information that is added to the control information outputted from the controller and identifies a virtual port of a virtual switch associated with the controller, into the associated physical port identification information identifying a physical port of a physical switch from which the control information is to be transmitted, based on the first table information stored in the memory, and relay the converted control information between the plurality of controllers or between a controller and a physical switch, based on the first table information, and based on the physical and virtual port identification information added to the control information.

2. The apparatus of claim 1, wherein
the apparatus further includes an output unit;
the converter outputs, to the output unit, the control information to which the virtual identification information obtained by performing the first conversion process is added; and
the output unit outputs the control information to which the virtual identification information is added, to the controller assigned to a virtual switch having a virtual port identified by the virtual identification information added to the control information.

3. The apparatus of claim 1, wherein
the memory further stores second table information in which a device type of a connection target and connection-target port identification information identifying a physical port of the connection target is stored in association with the physical port identification information;
the converter identifies, based on the first table information, the physical port identification information associated with the virtual port identification information added to the control information outputted from the first controller;
the converter identifies, based on the second table information, a device type of the connection target and the connection-target port identification information identifying a physical port of the connection target, associated with the identified physical port identification information;
the converter determines whether a device type of the connection target is a physical switch or not;
when a device type of the connection target is a physical switch, the converter identifies, based on the first table information, the virtual port identification information associated with the identified physical port identification information, converts the virtual port identification information added to the control information into the identified virtual port identification information, and outputs the control information to which the converted virtual port identification information is added, to the second controller; and
when a device type of the connection target is not a physical switch, the converter converts the virtual port identification information added to the control information outputted from the controller, into the identified physical port identification information, and transmits the control information to which the identified physical port identification information is added, to a third physical switch having a physical port identified by the identified physical port identification information.

4. The apparatus of claim 1, wherein
the predetermined protocol is a link layer discovery protocol or a spanning tree protocol.

5. A system comprising:
a control device; and
a plurality of physical switches, wherein
the control device includes:

a memory configured to store first table information in which physical port identification information identifying a physical port of a plurality of physical switches and virtual port identification information identifying a virtual port of the plurality of virtual switches are stored in association with each other so that each of the plurality of virtual switches is defined as a set of virtual ports each associated with one of physical ports of the plurality of physical switches, and a plurality of controllers each assigned to a different one of the plurality of virtual switches and configured to perform, on the assigned virtual switch, a control process that outputs control information determined based on a predetermined protocol and manages the control information that has been received from a physical switch; and a converter configured to:
perform a first conversion process on the control information received from the first physical switch, the first conversion process converting physical port identification information that is added to the received control information and identifies a physical port via which the physical switch has received the control information, into the virtual identification information identifying a virtual port of a virtual switch on which the control process is to be performed, based on the first table information stored in the memory;

perform, on the control information outputted from a controller, a second conversion process converting virtual port identification information that is added to the control information outputted from the controller and identifies a virtual port via which the control information is to be transmitted, into the associated physical port identification information identifying a physical port of a physical switch from which the control information is to be transmitted, based on the first table information stored in the memory, and relay the converted control information between the plurality of controllers or between a controller and a physical switch, based on the first table information and the physical and virtual port identification information added to the control information; and each of the plurality of physical switches is configured to:
output, upon receiving the control information to which the physical identification information is added from the control device, the received control information to a physical port identified by the physical identification information, add, upon receiving the control information to which the physical identification information is not added, the physical identification information identifying a physical port via which the control information has been received, to the received control information, and output the control information to which the physical identification information is added, to a physical port for transmitting the control information to the control device.

6. A non-transitory computer readable storage medium having stored therein a program for causing a computer to execute a procedure comprising:
providing first table information in which the physical port identification information identifying a physical port of a plurality of physical switches and virtual port identification information identifying a virtual port of the plurality of virtual switches are stored in association with each other so that each of the plurality of virtual switches is defined as a set of virtual ports each associated with one of physical ports of the plurality of physical switches;

providing a plurality of controllers each assigned to a different one of the plurality of virtual switches and configured to perform, on the assigned virtual switch, a control process that outputs control information determined based on a predetermined protocol and manages the control information that has been received from a physical switch;

performing, on control information received from a first physical switch, a first conversion process converting physical port identification information that is added to the received control information and identifies a physical port via which the physical switch has received the control information, into the virtual port identification information identifying a virtual port of a virtual switch on which the control process is to be performed, based on the first table information;

performing, on the control information outputted from a controller, a second conversion process converting virtual port identification information that is added to the control information outputted from the controller and identifies a virtual port of a virtual switch associated with the controller, into the associated physical port identification information identifying a physical port of a physical switch from which the control information is to be transmitted, based on the first table information; and relaying the converted control information on which the second conversion process has been performed, between the plurality of controllers or between a controller and a physical switch, based on the first table information and the physical and virtual port identification information added to the control information.

7. A method for controlling virtual switches, the method comprising:

providing first table information in which the physical port identification information identifying a physical port of a plurality of physical switches is stored in association with virtual port identification information identifying a virtual port of a plurality of virtual switches so that each of the plurality of virtual switches is defined as a set of virtual ports each associated with one of physical ports of the plurality of physical switches;

providing a plurality of controllers each assigned to a different one of the plurality of virtual switches and configured to perform, on the assigned virtual switch, a control process that outputs control information determined based on a predetermined protocol and manages the control information that has been received from a physical switch;

performing, on control information received from a first physical switch, a first conversion process converting physical port identification information that is added to the received control information and identifies a physical port via which the first physical switch has received the control information, into the virtual port identification information identifying a virtual port of a virtual switch on which the control process is to be performed, based on the first table information;

performing, on the control information outputted from a controller, a second conversion process converting virtual port identification information that is added to the control information outputted from the controller and identifies a virtual port of a virtual switch associated with the controller, into the associated physical port identification information identifying a physical port of a physical switch from which the control information is to be transmitted, based on the first table information; and relaying the converted control information on which the second conversion process has been performed, between the plurality of controllers or between a controller and a physical switch, based on the first table information and the physical and virtual port identification information added to the control information.

8. A method executed in a system having a control device and a plurality of physical switches, the method comprising:

providing the control device with first table information in which physical port identification information identifying a physical port of a plurality of physical switches is stored in association with virtual port identification information identifying a virtual port of a plurality of virtual switches so that each of the plurality of virtual switches is defined as a set of virtual ports each associated with one of physical ports of the plurality of physical switches;

upon receiving control information to which the physical identification information is not added, adding, by the first physical switch, the physical identification information identifying a physical port via which the control information has been received, to the received control information;

outputting, by each physical switch, the control information to which the physical identification information is added, to a port for transmitting the control information to the control device;

performing, by the control device, on the control information received from the each physical switch, a first conversion process converting physical port identification information that is added to the received control information and identifies a physical port via which the physical switch has received the control information, into the virtual port identification information identifying a virtual port of a virtual switch on which the control process is to be performed, based on the first table information;

performing, by the control device, on the control information outputted from the controller, a second conversion process converting virtual port identification information that is added to the control information outputted from the controller and identifies a virtual port of a virtual switch associated with the controller, into the associated physical port identification information identifying a physical port of a physical switch from which the control information is to be transmitted, based on the first table information;

relaying, by the control device, the converted control information on which the second conversion process has been performed, between the plurality of controllers or between a controller and a physical switch, based on the first table information and the physical and virtual port identification information added to the control information; and outputting, by each physical switch, upon receiving the control information to which the physical port identification information is added from the control device, the received control information to a physical port identified by the physical port identification information added to the received control information.

9. The apparatus of claim 1, wherein when it is determined that the virtual port identification information added to the control information outputted from a first controller is associated, in the first table information, with a physical port of a first physical switch which is coupled to a second physical switch associated with a second virtual switch, the converter directly relays the control information outputted from the first controller to a second controller assigned to a second virtual machine, without transferring the control information via the first and second physical switches.

* * * * *